United States Patent
Ma

(10) Patent No.: US 10,924,806 B2
(45) Date of Patent: Feb. 16, 2021

(54) VIDEO PLAYING CONTROL METHOD AND APPARATUS, AND VIDEO PLAYING SYSTEM

(71) Applicant: Advanced New Technologies Co., Ltd., George Town (KY)

(72) Inventor: Yixin Ma, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 22 days.

(21) Appl. No.: 16/205,411

(22) Filed: Nov. 30, 2018

(65) Prior Publication Data

US 2019/0110107 A1    Apr. 11, 2019

Related U.S. Application Data

(63) Continuation of application No. PCT/CN2017/085284, filed on May 22, 2017.

(51) Int. Cl.
| | |
|---|---|
| *H04N 21/472* | (2011.01) |
| *H04N 21/44* | (2011.01) |
| *H04N 21/431* | (2011.01) |
| *H04N 21/482* | (2011.01) |

(52) U.S. Cl.
CPC ..... *H04N 21/47217* (2013.01); *H04N 21/431* (2013.01); *H04N 21/44* (2013.01); *H04N 21/482* (2013.01); *H04N 21/472* (2013.01)

(58) Field of Classification Search
CPC ........... H04N 21/47217; H04N 21/431; H04N 21/44; H04N 21/482; H04N 21/472
See application file for complete search history.

(56) References Cited

U.S. PATENT DOCUMENTS

| | | | | |
|---|---|---|---|---|
| 7,444,659 | B2 * | 10/2008 | Lemmons | H04N 7/17318 |
| | | | | 375/E7.006 |
| 10,489,021 | B2 * | 11/2019 | Ekstrand | H04N 21/4312 |
| 2003/0123853 | A1 | 7/2003 | Iwahara et al. | |
| 2003/0174160 | A1 | 9/2003 | Deutscher et al. | |

(Continued)

FOREIGN PATENT DOCUMENTS

| | | |
|---|---|---|
| CN | 101622866 | 1/2010 |
| CN | 104202658 | 12/2014 |

(Continued)

OTHER PUBLICATIONS

European Extended Search Report in European Patent Application No. 17805693.3, dated May 3, 2019, 12 pages.

(Continued)

*Primary Examiner* — Sumaiya A Chowdhury
(74) *Attorney, Agent, or Firm* — Fish & Richardson P.C.

(57) ABSTRACT

Content of a video is parsed to identify one or more topics of the content. The video is divided into one or more video clips corresponding to a video playback of one or more topics. One or more titles corresponding to, and descriptive of, the one or more video clips are displayed. One or more visual effects corresponding to the one or more titles and indicative of corresponding playback statuses of the one or more video clip are displayed. A video clip is played, where the video clip is based on a particular title of the one or more titles selected from a time point determined based on a corresponding playback status of the video clip.

17 Claims, 9 Drawing Sheets

(56) References Cited

U.S. PATENT DOCUMENTS

| | | | | |
|---|---|---|---|---|
| 2007/0136755 A1* | 6/2007 | Sakai | ................ | G06F 16/78 |
| | | | | 725/46 |
| 2010/0034510 A1* | 2/2010 | Oda | ................ | G06Q 30/06 |
| | | | | 386/350 |
| 2014/0272912 A1 | 9/2014 | Rozycki et al. | | |
| 2014/0334794 A1 | 11/2014 | Walker | | |
| 2016/0148524 A1 | 5/2016 | Pulido et al. | | |

FOREIGN PATENT DOCUMENTS

| | | |
|---|---|---|
| CN | 105430508 | 3/2016 |
| KR | 101399234 | 5/2014 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report by the International Searching Authority issued in International Application No. PCT/CN2017/085284 dated Aug. 11, 2017; 8 pages.

International Preliminary Report on Patentability in International Application No. PCT/CN2017/085284 dated Dec. 4, 2018; 8 pages.

\* cited by examiner

VIDEO PLAYING CONTROL METHOD AND APPARATUS, AND VIDEO PLAYING SYSTEM

CROSS-REFERENCE TO RELATED APPLICATIONS

This application is a continuation of PCT Application No. PCT/CN2017/085284, filed on May 22, 2017, which claims priority to Chinese Patent Application No. 201610390721.7, filed on Jun. 2, 2016, and each application is hereby incorporated by reference in its entirety.

TECHNICAL FIELD

The present application pertains to the field of multimedia information data processing technologies and, in particular, to a video playing control method and apparatus and a video playing system.

BACKGROUND

With the rapid development of Internet and computer technologies, online multimedia enriches people's lives. Video programs such as online education programs, technical tutorial programs, and product instruction programs are favored by many users.

When playing a video, a large quantity of recorded video programs usually need to be cut and edited, to split the video into a plurality of short video copies based on demand. Each short video copy can use a video name to display main content of the video copy. However, a video usually includes a lot of node information. For example, each online education course can be a video, and the course can include several chapters. If a user wants to directly select and watch a chapter based on chapter distribution of the course, the user usually needs to search for the chapter by dragging a mouse, or locate and watch the chapter by using thumbnail display function through points on a progress bar. Apparently, this method cannot display all nodes in one video, especially in a process introduction video, a product instruction video, etc., and it is difficult for the user to clearly understand the node distribution of the video.

In the existing technology, for distribution and control of video nodes, a plurality of chapters usually correspond to a plurality of videos. A video cannot display all nodes included in the video based on video display content, and user experience about understanding nodes in the video and performing interactive progress control is relatively poor.

SUMMARY

An objective of the present application is to provide a video playing control method and apparatus and a video playing system, so that a user can grasp a video content node and a video playback time more conveniently and clearly, by using a video progress control relationship based on an event node, and thus video playing interaction experience of the user can be improved.

The video playing control method and apparatus, and the video playing system provided in the present application are implemented as follows:

A video playing control method is provided and the method includes: defining a display node of a target video based on an event node of the target video, where the event node includes an event node that is defined and set by using at least one of a timeline node and a target-object spatial location node that are based on display content of the target video; determining a video runtime node of the display node, generating a node control interface of the target video, and displaying a playing status of the display node on the node control interface; and when a trigger instruction clicked by a user on the node control interface for jumping to a target display node is received, obtaining a video runtime node of the target display node, playing the target video from the video runtime node of the target display node, and updating a playing status of the target display node based on a video playback time of the target display node.

A video playing control apparatus is provided, and the apparatus includes: a display node setting module, configured to define a display node of a target video based on an event node of the target video, where the event node includes an event node that is defined and set by using at least one of a timeline node and a target-object spatial location node that are based on display content of the target video; a node control interface module, configured to determine a video runtime node of the display node, generate a node control interface of the target video, and display a playing status of the display node on the node control interface; and a playing processing module, configured to obtain a video runtime node of the target display node, play the target video from the video runtime node of the target display node, and update a playing status of the target display node based on a video playback time of the target display node when a trigger instruction clicked by a user on the node control interface for jumping to a target display node is received video playback time.

A video playing system is provided, and the system includes a video playing unit and a node control unit.

The video playing unit is configured to play video content of a corresponding display node in a target video based on a trigger instruction of a user.

The node control unit is configured to define a display node of the target video based on an event node of the target video, where the event node includes an event node that is defined and set by using at least one of a timeline node and a target-object spatial location node that are based on display content of the target video; determine a video runtime node of the display node, generate a node control interface of the target video, and display a playing status of the display node on the node control interface; and when a trigger instruction clicked by the user on the node control interface for jumping to a target display node is received, obtain a video runtime node of the target display node, play the target video of the video playing unit from the video runtime node of the target display node, and update a playing status of the target display node based on a video playback time of the target display node.

According to the video playing control method and apparatus, and the video playing system provided in the present application, all nodes, procedure steps, etc. can be displayed in one video, and a progress view can be recorded and labeled. In an online education video, a process video, a merchandise function introduction video, a component display video, etc., a corresponding event node can be set based on video content. These event nodes can correspond, on a one-to-one basis, with chapters, steps, components, and such in content played by the video, and the event nodes are used to enable or control playing and recording of the video. In the present application, all node information of the video is set and displayed based on the event nodes, so that node relationship information of playing content of the video can be clearly displayed to the user, to help the user perform video progress control conveniently, quickly, and effectively, and improve video playing interaction experience of the user.

BRIEF DESCRIPTION OF DRAWINGS

To describe the technical solutions in the implementations of the present application or in the existing technology more clearly, the following briefly describes the accompanying drawings required for describing the implementations or the existing technology. The accompanying drawings in the following description merely show some implementations of the present application, and a person of ordinary skill in the art can still derive other drawings from these accompanying drawings without creative efforts.

DESCRIPTION OF IMPLEMENTATIONS

To make a person skilled in the art understand the technical solutions in the present application better, the following clearly and completely describes the technical solutions in the implementations of the present application with reference to the accompanying drawings in the implementations of the present application. Apparently, the described implementations are merely some, but not all of the implementations of the present application. All other implementations obtained by a person of ordinary skill in the art based on the implementations of the present application without creative efforts shall fall within the protection scope of the present application.

Figure 1:
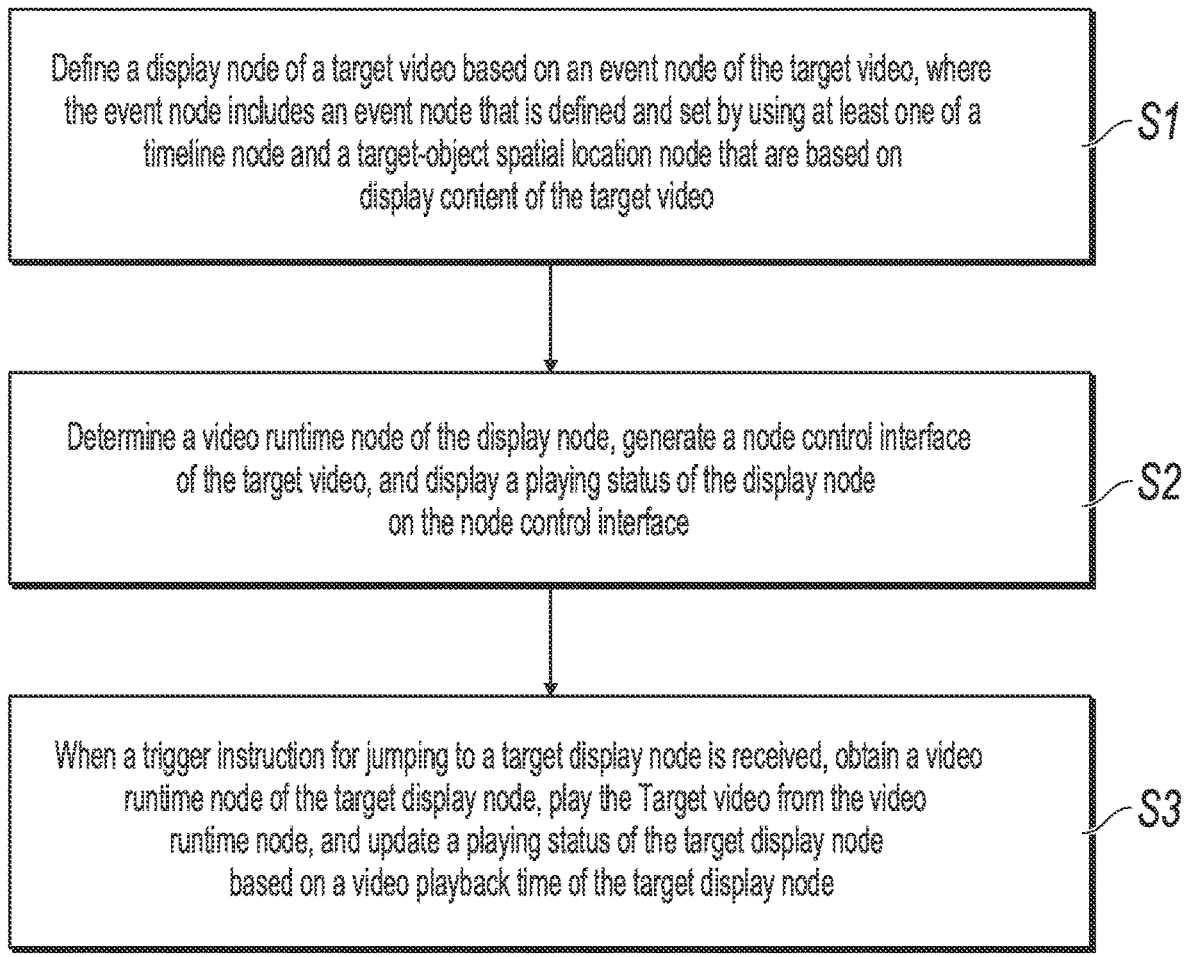
FIG. 1 is a flowchart illustrating a video playing control method, according to an implementation of the present application.

FIG. 1 is a flowchart illustrating a video playing control method, according to an implementation of the present application. Although the present application provides operation steps of a method or a structure of an apparatus shown in the following implementations or the accompanying drawings, the method or the apparatus can include more or fewer operation steps or module structures based on conventional or non-creative efforts. For steps or structures that have no necessary causal relationship in logic, an execution sequence of the steps or a module structure of the apparatus is not limited to an execution sequence or a module structure provided in the implementations of the present application. When the method or the module structure is applied in an actual apparatus or an actual terminal product, the method or the module structure can be executed based on the sequence of the method or the module structure in the implementations or the accompanying drawings, or can be executed in parallel (for example, under parallel processors, multithreaded processing, or even distributed processing environments).

As shown in FIG. 1, the video playing control method provided in this implementation of the present application can include the following steps.

S1: Define a display node of a target video based on an event node of the target video, where the event node includes an event node that is defined and set by using at least one of a timeline node and a target-object spatial location node that are based on display content of the target video.

In this implementation of the present application, a display node of a target video that needs to be processed can be defined based on an event node of the target video. Generally, several event nodes are included in a guiding target video such as a product application promotion video, a marketing video, a user registration video, or an educational guidance video. In the present application, the event node can include a temporal or spatial dimension based on display content of a video. The temporal dimension is usually a timeline node based on display content of a target video. For example, one course video includes a plurality of chapters, each chapter can be a timeline node based on a course learning progress, and each chapter can be used as a display node of the target video. Alternatively, in a product release method video under a management program that includes five operational steps: 1. create an activity template; 2. name a page; 3. select an element for editing; 4. complete editing; and 5. release. In this case, the five steps in the video can be used as event nodes of a timeline node type, and the five steps are separately used as five display nodes of the target video.

Figure 2:
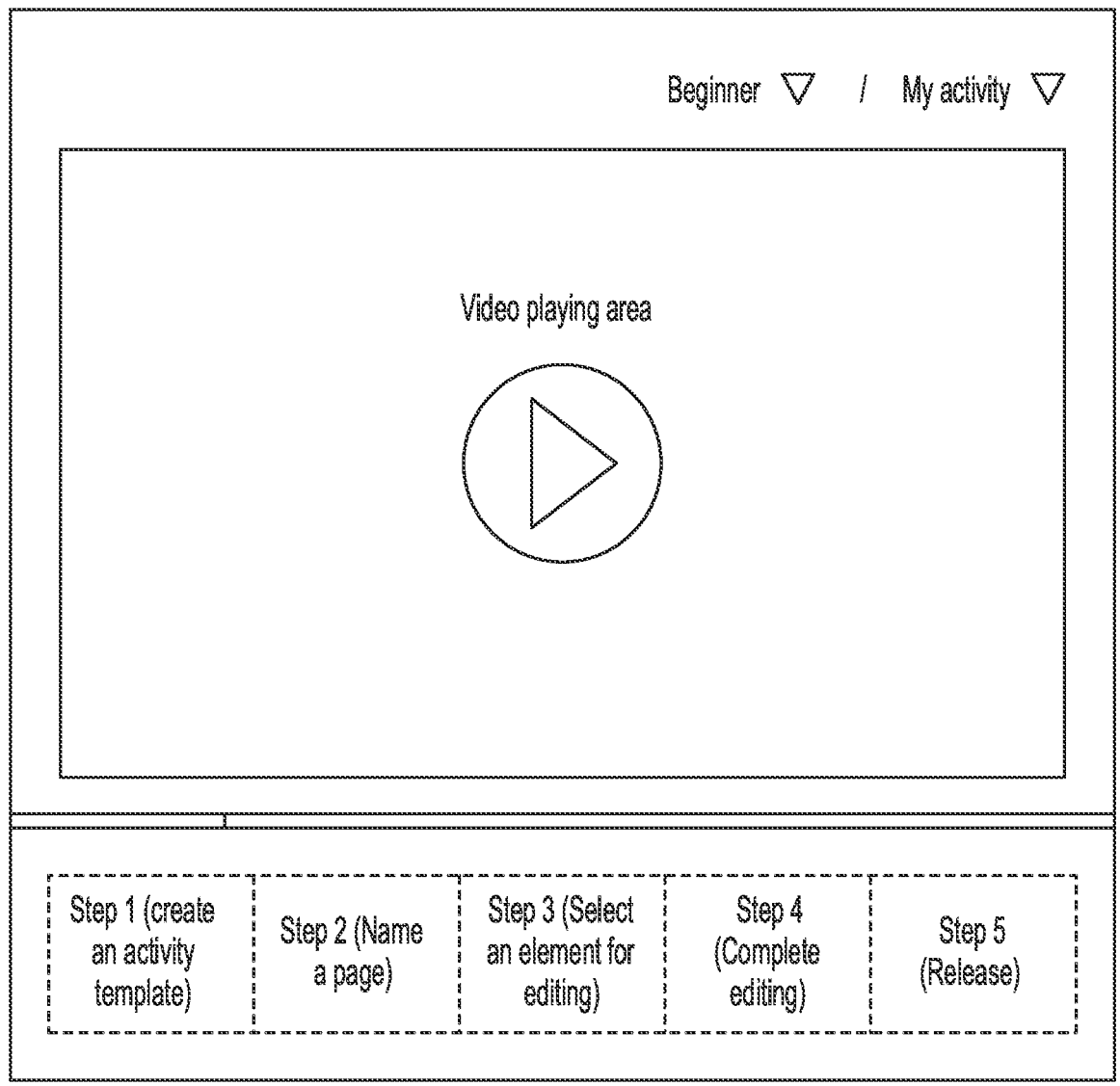
FIG. 2 is a schematic diagram illustrating a video playback control interface on which a progress is replaced by a step pattern in an implementation application scenario, according to the present application.

FIG. 2 is a schematic diagram illustrating a video playback control interface on which a progress is replaced by a step pattern in an implementation application scenario, according to the present application. In FIG. 2, five display nodes are defined in the description video based on an actual activity releasing operation order. A specific event node of a timeline node can be determined based on actual content of the target video. In an implementation of the video playing control method provided in the present application, the timeline node based on the display content of the target video can include:

S101: A temporal dimension node that is set based on at least one of a learning progress, a content chapter node, and a step division node of the display content of the same target video.

In another application scenario, if the display content of the target video relates to a detailed merchandise instruction, a product introduction, etc., the target video can be defined as a display node of a corresponding component based on video content of each component of a target object (for example, a product) actually displayed in the same target video. A component description node relationship of the target object in the target video can be learned more conveniently and clearly through such video content node display based on the target-object spatial location node in the video, to help the user select and understand the video content, and improve a video display effect and user experience.

Figure 3:
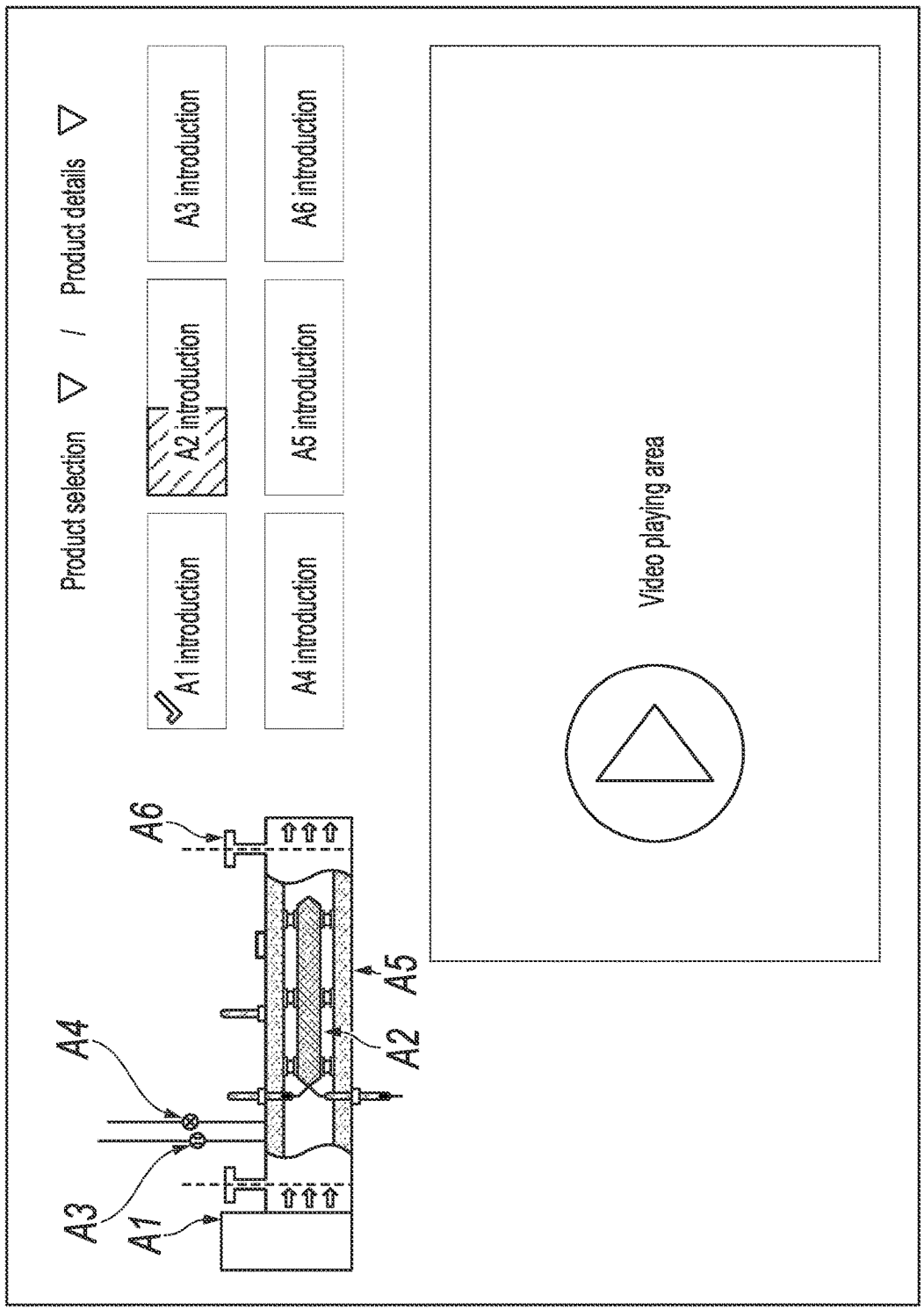
FIG. 3 is a schematic diagram illustrating a video playback control interface on which each component of a target object is used as a display node in another implementation application scenario, according to the present application.

FIG. 3 is a schematic diagram illustrating a video playback control interface on which each component of a target object is used as a display node in another implementation application scenario, according to the present application. In FIG. 3, actual display content of the original target video represents function descriptions of components A1, A2, A3, A4, A5, and A6 of a merchandise A. In this implementation of the present application, each component to be displayed in the target video can be used as an event node of the target video, and the target video is divided into six display nodes A1, A2, A3, A4, A5, and A6. There can be other target-object spatial location nodes in another implementation. For example, in a target video whose target object separately shows top, pants, shoes, socks, and a hat of a model in an advertisement, the top, the pants, the shoes, the hat, and the socks can be separately used as event nodes. A specific event node of a target-object spatial location node can be determined based on actual content of the target video. In an implementation of the video playing control method provided in the present application, the target-object spatial location node based on the display content of the target video can include:

S102: A spatial dimension node that is set based on a display component of a target object in the display content of the same target video.

In another application scenario, an event node combining a timeline node and a target-object spatial location node can be determined based on display content of a target video, and then a display node of the target video is defined. It is worthwhile to note that the event node in the present application usually can be a step node, a component node, etc., determined based on actual display content of a target video, especially a merchandise display video, an education video, a process guidance video, etc., and used to display playing content of the target video to the user, so that the original target video becomes a guiding video, to help the user learn and control video content and video progress quickly and effectively.

In the video playing control method in the present application, the display node of the target video can be defined based on the event node of the target video. The event node includes the event node that is defined and set by using at least one of the timeline node and the target-object spatial location node that are based on the display content of the target video.

S2: Determine a video runtime node of the display node, generate a node control interface of the target video, and display a playing status of the display node on the node control interface.

Each defined display node of the target video can be a progress segment of the target video, and usually includes a start time node and an end time node of the display node. In this implementation of the present application, after the display node of the target video is determined, and time node information of a related event is defined, a node control interface on which the display node is arranged can be generated. The node control interface can be disposed at a location adjacent to a playing area of the target video. For example, the node control interface can display operation execution steps below a video playing area as illustrated in FIG. 2, or it can display a product functional component above a video playing area as illustrated in FIG. 3. The node control interface can be disposed in a corresponding location area based on an application or web page interface design requirement. The node control interface can display all defined display nodes of the target video. Each display node can correspond to a corresponding video runtime node of the display node in the target video, for example, a start time node and an end time node of the display node. When an actual product is designed, video runtime node information of the display nodes can be set inside a display node control, and is not displayed to the user. The video runtime node information can be displayed to the user, to directly display runtime information of the display nodes in the target video to the user.

In this implementation of the present application, the playing status of the display node can be set based on information such as whether the display node is clicked by the user for playing and whether the display node is finished, and a pattern of the playing status of the display node can be displayed on the node control interface. For example, in the application scenario in FIG. 3, a playing status of the display nodes of the components of the merchandise A can be set to include: an unplayed state, an unfinished state, and a played state. An initial playing status of each display node of the target video can be set to unplayed state. A corresponding pattern of the playing status can be designed based on a design requirement. For example, an unplayed display node can be set to a black character on a white background, a played display node can be set to be marked with "√", and a corresponding background color of an unfinished display node such as "A2 description" can be changed in node space based on a video playback time.

The node control interface of the target video is generated based on the display node. The video runtime node of the display node on the node control interface can be set based on runtime information of each display node in the target video, and a corresponding play status is displayed on the node control interface based on a video playback time of the display node.

S3: When a trigger instruction clicked by a user on the node control interface for jumping to a target display node is received, obtain a video runtime node of the target display node, play the target video from the video runtime node of the target display node, and update a playing status of the target display node based on a video playback time of the target display node.

After the display node based on the event node is defined and set, and the node control interface of the target video is generated, a play instruction of the user, such as clicking a step or a component on the node control interface, that triggers a corresponding target display node can be obtained, and the target video can be played from the video runtime node corresponding to the target display node.

In this implementation of the present application, labeling can be automatically performed based on the video playback time of the target display node, and the playing status of the target display node is updated. For example, after the target video jumps to the target display node, the target display node starts to play until the target display node is finished. Therefore, the playing status of the target display node is updated from an unplayed state to a played state, and the playing status of the target display node is displayed as a played state on the node control interface.

According to the video playing control method provided in this implementation of the present application, all nodes, procedure steps, etc. can be displayed in one video, and a progress view can be recorded and labeled. In an online education video, a process video, a merchandise function video, a component display video, etc., a corresponding event node can be set based on video content. These event nodes can correspond on a one-to-one basis with chapters, steps, components, etc. in content played by the video, and the event nodes are used to enable or control playing and recording of the video. In the present application, all node information of the video is set and displayed based on the event nodes, so that node relationship information of playing content of the video can be clearly displayed to the user, to help the user perform video progress control conveniently, quickly, and effectively, and improve video playing interaction experience of the user.

In another implementation of the present application, current video playback time information of the target video can be recorded. If a progress segment video of a current display node is unfinished, and the user clicks another display node for playing, video playback time information of the current display node can be recorded, the current display node can jump to the another display node clicked by the user for playing, and a playing status of the current display node is set to an unfinished playing state, so that the user can have an overall grasp and control on playing of the target video on the node control interface. Therefore, in another implementation the video playing control method in the present application, the method can further include the following step:

S4: If a trigger instruction for jumping to a first target display node is received when a current display node of the target video is played, use a video playback time of the current display node as a video runtime node of the current display node, set a playing status of the current display node to an unfinished playing state, correspondingly display the unfinished playing state of the current display node on the node control interface, and play the target video from a video runtime node of the first target display node.

Figure 4:
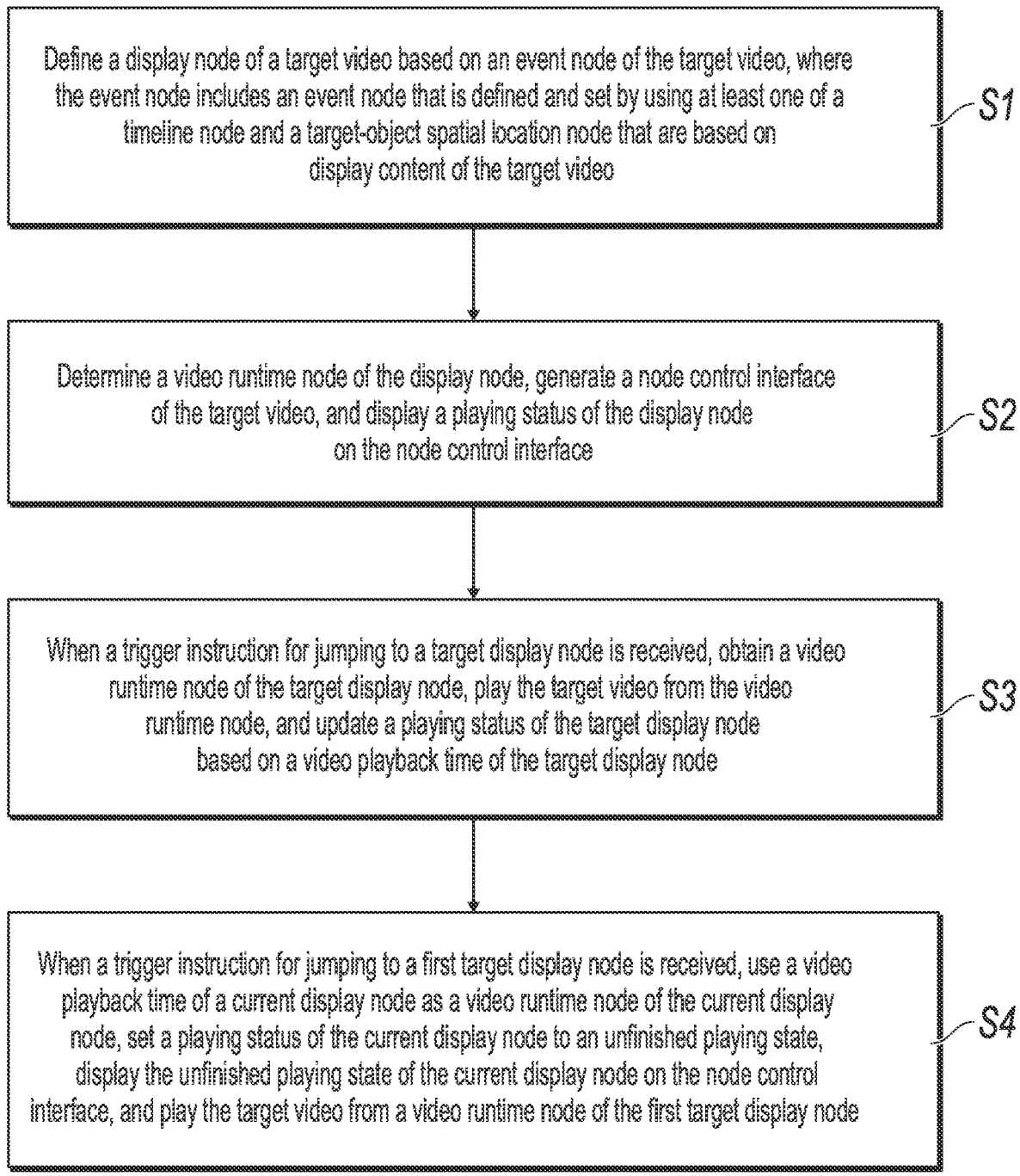
FIG. 4 is a flowchart illustrating a video playing control method, according to another implementation of the present application.

FIG. 4 is a flowchart illustrating a video playing control method, according to another implementation of the present application. For an implementation effect diagram in a specific application scenario, references can be made to FIG. 3.

In another implementation of the video playing control method in the present application, if the display node clicked by the user is in an unfinished state, the display node can continue to be played from a previously recorded video playback time in the same target video. Therefore, segment playing control of each display node can be separately implemented in one video, to guide the user to perform automatic, precise, and clear progress control on a course learning video, a merchandise display video, etc.

Figure 5:
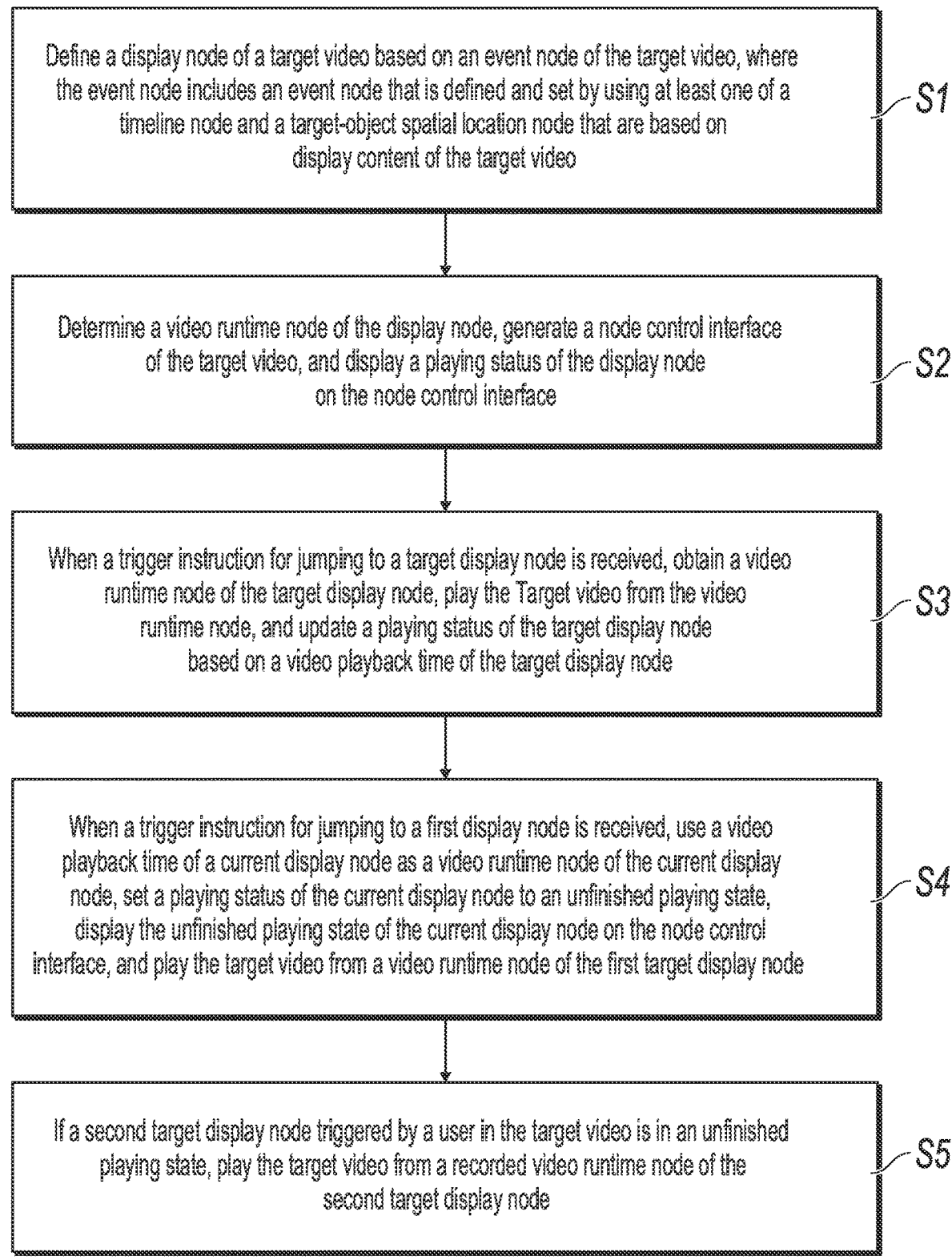
FIG. 5 is a flowchart illustrating a video playing control method, according to another implementation of the present application.

FIG. 5 is a flowchart illustrating a video playing control method, according to another implementation of the present application. As shown in FIG. 5, the method can further include the following step:

S5: If a second target display node triggered by the user in the target video is in an unfinished playing state, play the target video from a recorded video runtime node of the second target display node.

The target display node, the first target display node, and the second target display node can be collective names mainly set to distinguish between a display node that is currently played and a display node to be jumped to in different application scenarios. For example, in some applications scenarios, the second target display node can be a first target display node.

According to the video playing control method provided in the previous implementations, all nodes, procedure steps, etc. can be displayed in one video, and a progress view can be recorded and labeled. In an online education video, a process video, a merchandise function introduction video, a component display video, etc., a corresponding event node can be set based on video content. These event nodes can correspond, on a one-to-one basis with chapters, steps, components, etc. in content played by the video, and the event nodes are used to enable or control playing and recording of the video. In the present application, all node information of the video is set and displayed based on the event nodes, so that node relationship information of playing content of the video can be clearly displayed to the user, to help the user perform video progress control conveniently, quickly, and effectively, and improve video playing interaction experience of the user.

Figure 6:
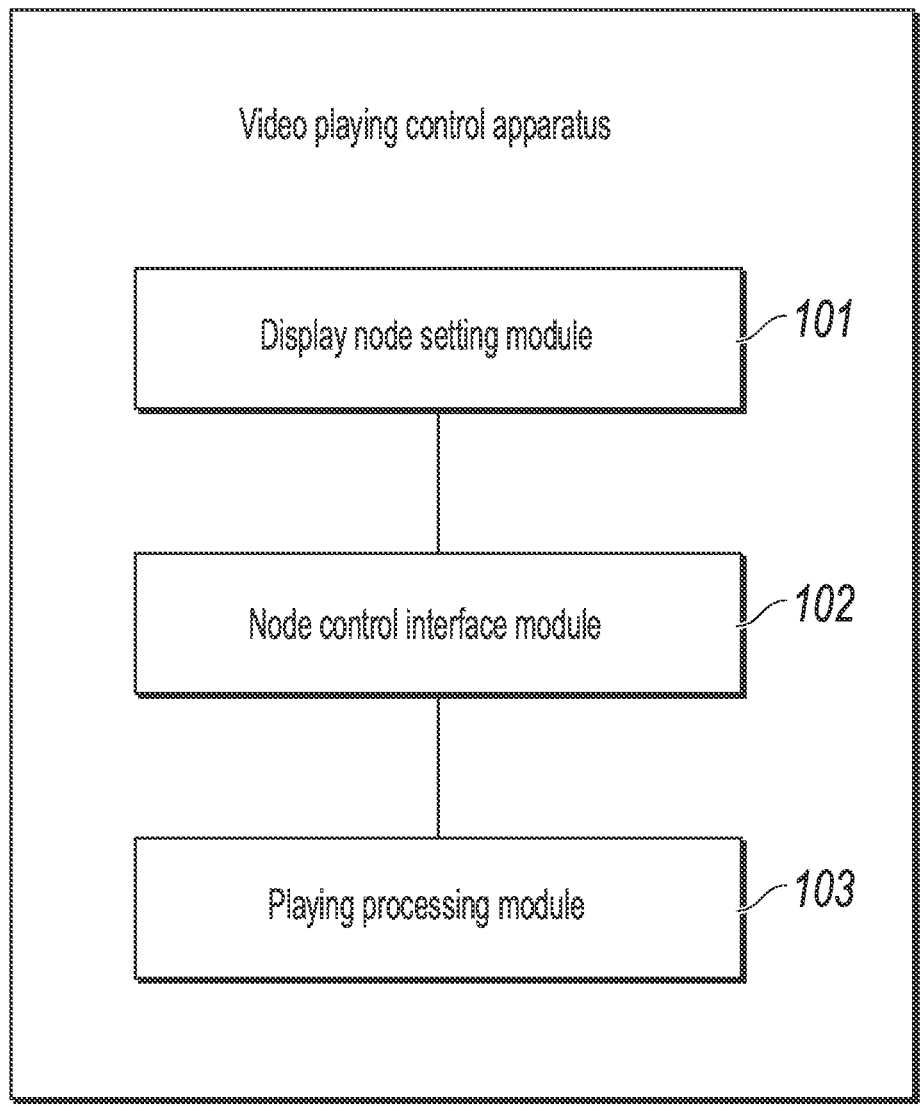
FIG. 6 is a schematic structural diagram illustrating modules of a video playing control apparatus, according to an implementation of the present application.

Based on the video playing control method in the present application, the present application provides a video playing control apparatus. FIG. 6 is a schematic structural diagram illustrating modules of a video playing control apparatus, according to an implementation of the present application. As shown in FIG. 6, the apparatus can include: a display node setting module 101, configured to define a display node of a target video based on an event node of the target video, where the event node includes an event node that is defined and set by using at least one of a timeline node, and a target-object spatial location node that are based on display content of the target video; a node control interface module 102, configured to determine a video runtime node of the display node, generate a node control interface of the target video, and display a playing status of the display node on the node control interface; and a playing processing module 103, configured to obtain a video runtime node of the target display node, play the target video from the video runtime node of the target display node, and update a playing status of the target display node based on a video playback time of the target display node when a trigger instruction clicked by a user on the node control interface for jumping to a target display node is received.

In the video playing control apparatus in the present application, the display node setting module 101 can determine that the event node of the target video forms a temporal dimension or a spatial dimension, to further determine the display node of the target video. Therefore, in another implementation of the video playing control apparatus in the present application, the timeline node based on the display content of the target video includes: a temporal dimension node that is set based on at least one of a learning progress, a content chapter node, and a step division node of the display content of the same target video.

In another implementation of the apparatus, the target-object spatial location node based on the display content of the target video includes: a spatial dimension node that is set based on a display component of a target object in the display content of the same target video.

For a specific method that the event node is set in a temporal or spatial dimension based on actual playing content of the target video, references can be made to related descriptions in other implementations of the present application, and details are omitted here for simplicity.

Figure 7:
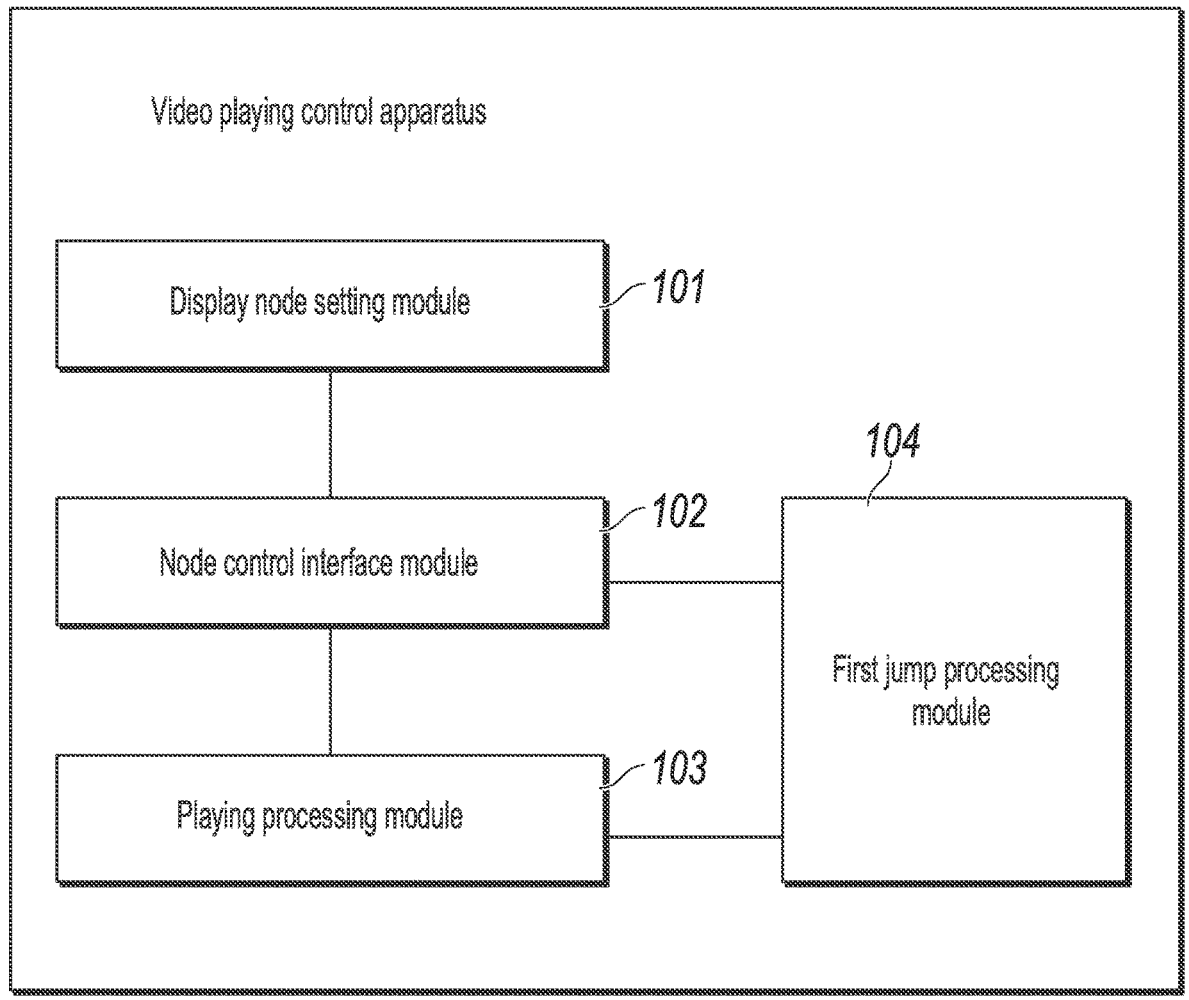
FIG. 7 is a schematic structural diagram illustrating modules of a video playing control apparatus, according to another implementation of the present application.

FIG. 7 is a schematic structural diagram illustrating modules of a video playing control apparatus, according to another implementation of the present application. As shown in FIG. 7, the apparatus can further include: a first jump processing module 104, configured to use a video playback time of the current display node as a video runtime node of the current display node, set a playing status of the current display node to an unfinished playing state, correspondingly display the unfinished playing state of the current display node on the node control interface, and play the target video from a video runtime node of the first target display node, if a trigger instruction for jumping to a first target display node is received when a current display node of the target video is played.

In an implementation of the apparatus according to the present application, current video playback time information of the target video can be recorded. If a progress segment video of the current display node is unfinished, and the user clicks another display node for playing, the video playback time information of the current display node can be recorded, the current display node can jump to the another display node clicked by the user for playing, and a playing status of the current display node is set to an unfinished playing state, so that the user can have an overall grasp and control on playing of the target video on the node control interface.

Figure 8:
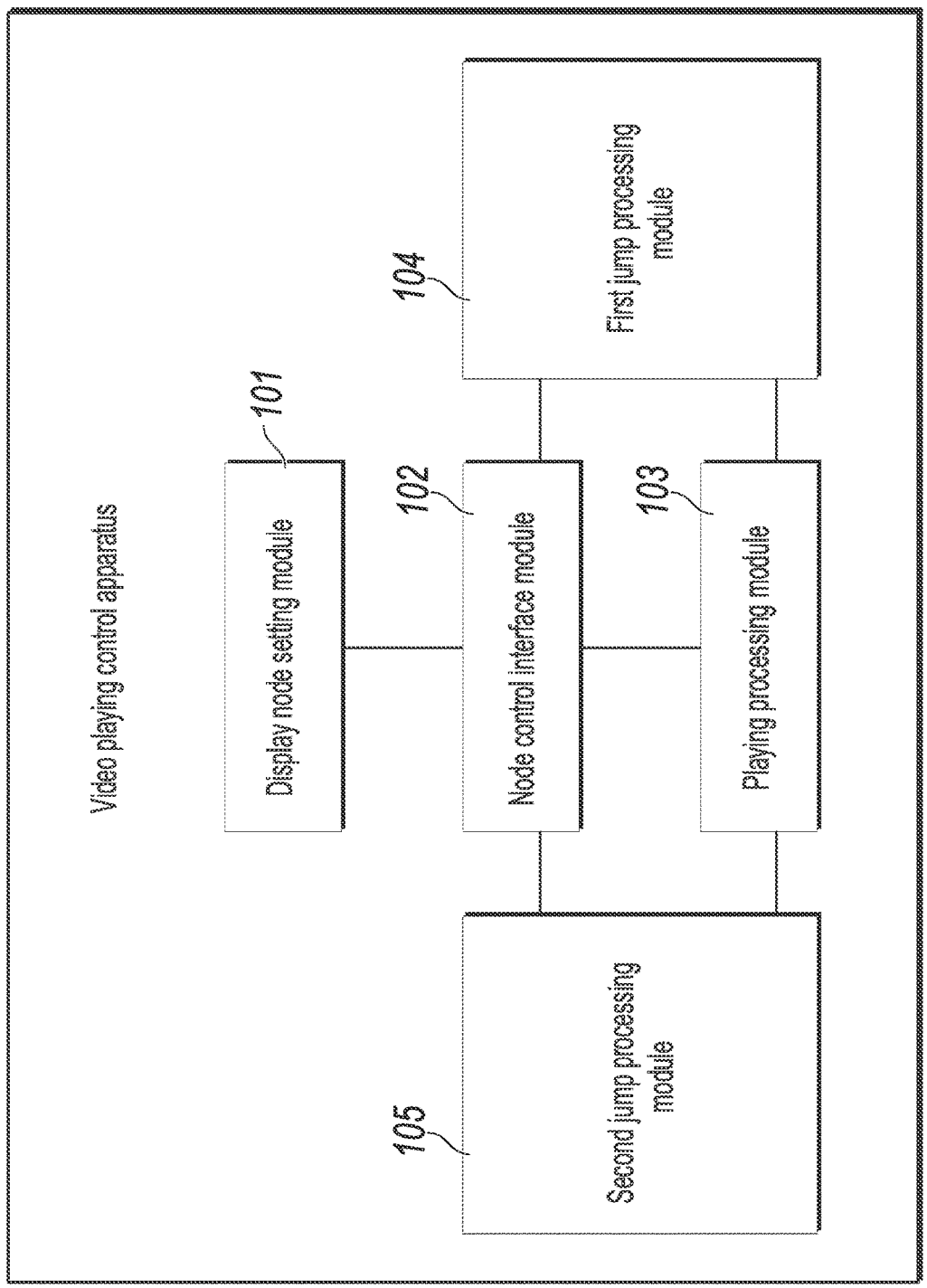
FIG. 8 is a schematic structural diagram illustrating modules of a video playing control apparatus, according to another implementation of the present application.

FIG. 8 is a schematic structural diagram illustrating modules of a video playing control apparatus, according to another implementation of the present application. As shown in FIG. 8, the apparatus can further include: a second jump processing module 105, configured to play the target video from a recorded video runtime node of the second target display node if a second target display node triggered by the user in the target video is in an unfinished playing state.

In an implementation of the apparatus according to the present application, if a display node clicked by the user is in an unfinished state, the display node can continue to be played from a previously recorded video playback time in the same target video. Therefore, segment playing control of each display node can be separately implemented in one video, to guide the user to perform automatic, precise, and clear progress control on a course learning video, a merchandise display video, etc.

According to the video playing control apparatus provided in this implementation of the present application, all nodes, procedure steps, etc. can be displayed in one video, and a progress view can be recorded and labeled. In an online education video, a process video, a merchandise function introduction video, a component display video, etc., a corresponding event node can be set based on video content. These event nodes can correspond on a one-to-one basis with chapters, steps, components, etc. in content played by the video, and the event nodes are used to enable or control playing and recording of the video. In the present application, all node information of the video is set and displayed based on the event nodes, so that node relationship information of playing content of the video can be clearly displayed to the user, to help the user perform video progress control conveniently, quickly, and effectively, and improve video playing interaction experience of the user.

The previous video playing control method or apparatus can be applied to a video playing system in a plurality of application scenarios, including a mobile device APP, video playing on a page, etc. Node playing control interaction performed by a user on one video can be implemented by using an event node pattern of video content of nodes such as steps, chapters, or components, and a control relationship of the entire video is clear. An event node and a procedure are used to complete video playing guidance and automatically label a video playback time, so that the user has more independence and control in an overall video cognition process, and video playing interaction experience of the user can be improved. Therefore, the present application provides a video playing system, and the system includes a video playing unit and a node control unit.

The video playing unit can be configured to play video content of a corresponding display node in a target video based on a trigger instruction of a user.

The node control unit can be configured to define a display node of the target video based on an event node of the target video, where the event node includes an event node that is defined and set by using at least one of a timeline node and a target-object spatial location node that are based on display content of the target video; determine a video runtime node of the display node, generate a node control interface of the target video, and display a playing status of the display node on the node control interface; and when a trigger instruction clicked by the user on the node control interface for jumping to a target display node is received, obtain a video runtime node of the target display node, play the target video of the video playing unit from the video runtime node of the target display node, and update a playing status of the target display node based on a video playback time of the target display node.

The video playing unit can be set in a terminal application or page, so that a player plays the target video. Correspondingly, as described above, the timeline node based on the display content of the target video in the playing system can include: a temporal dimension node that is set based on at least one of a learning progress, a content chapter node, and a step division node of the display content of the same target video. Alternatively, the target-object spatial location node based on the display content of the target video includes: a spatial dimension node that is set based on a display component of a target object in the display content of the same target video. In the playing system, if a trigger instruction for jumping to a first target display node is received when a current display node of the target video is played, a video playback time of the current display node is used as a video runtime node of the current display node, a playing status of the current display node is set to an unfinished playing state, the unfinished playing state of the current display node is correspondingly displayed on the node control interface, and the target video is played from a video runtime node of the first target display node. Further, the system can implement the following operation: if a second target display node triggered by the user in the target video is in an unfinished playing state, playing the target video from a recorded video runtime node of the second target display node. For a specific implementation, references can be made to descriptions related to the previous method or apparatus, and details are omitted here for simplicity.

Although descriptions of node setting, interface setting, and an information exchange method such as defining an event node in a temporal or spatial dimension by using chapters, steps, components, etc. of video playing content, displaying different playing states, triggering a video playing or jump instruction, etc. are mentioned in the content of the present application, the present application is not necessarily limited to situations described by an information definition method, an industry processing standard, a specification, or the implementations. An implementation solution slightly modified by using some industry standards or on a basis of described implementations can also implement an implementation effect that is the same as, equivalent to, or similar to the described implementation, or an expected implementation effect obtained after transformation. Applying these modified or transformed node setting, interface setting, an information exchange method, etc. can still fall within the protection scope of the optional implementation solution of the present application.

Although the present application provides method operation steps described in the implementations or flowcharts, more or fewer operation steps can be included based on conventional or non-creative means. The sequence of the steps listed in the implementations is merely one of numerous step execution sequences, and does not represent the unique execution sequence. For an actual apparatus or client product, the steps can be executed based on the method sequence illustrated in the implementations or accompanying drawings or executed in parallel (for example, an environment of parallel processors or multi-threaded processing).

The units, apparatus, or modules illustrated in the previous implementations can be implemented by using a computer chip or an entity, or can be implemented by using a product having a certain function. For ease of description, the previous apparatus is described by dividing the functions into various modules. When the present application is implemented, the functions of the modules can be implemented by using the same or a plurality of pieces of software and/or hardware, or a module for implementing one function is implemented by using a combination of a plurality of submodules or subunits. For example, the playing processing module 103, the first jump processing module 104, and the second jump processing module 105 can be implemented by one function module.

A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus included in the controller and configured to implement various functions can also be considered as a structure in the hardware component. Alternatively, the apparatus configured to implement various functions can even be considered as both a software module implementing the method and a structure in the hardware component.

The present application can be described in the general context of computer executable instructions executed by a computer, for example, a program module. Generally, the program module includes a routine, a program, an object, a component, a data structure, a type, etc. that executes a specific task or implements a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

It can be seen from the descriptions of the implementations that a person skilled in the art can clearly understand that the present application can be implemented by using software and a necessary general hardware platform. Based on such understanding, the technical solutions of the present application essentially or the part contributing to the existing technology can be implemented in a form of a software product. The software product can be stored in a storage medium such as a ROM/RAM, a magnetic disk, or an optical disc, and includes several instructions for instructing a computer device (which can be a personal computer, a mobile device, a server, a network device, etc.) to perform the methods described in the implementations or in some parts of the implementations of the present application.

The implementations in the present specification are described in a progressive method. For the same or similar parts in the implementations, references can be made to each other. Each implementation focuses on a difference from other implementations. The present application can be applied to many general-purpose or dedicated computer system environments or configurations, for example, a personal computer, a server computer, a handheld device or a portable device, a tablet device, a multi-processor system, a microprocessor-based system, a set top box, a programmable video playing system, a network PC, a small computer, a mainframe computer, and a distributed computing environment including any one of the previous systems or devices.

Although the present application is described by using the implementations, a person of ordinary skill in the art knows that many modifications and variations of the present application can be made without departing from the spirit of the present application. It is expected that the claims include these modifications and variations without departing from the spirit of the present application.

Figure 9:
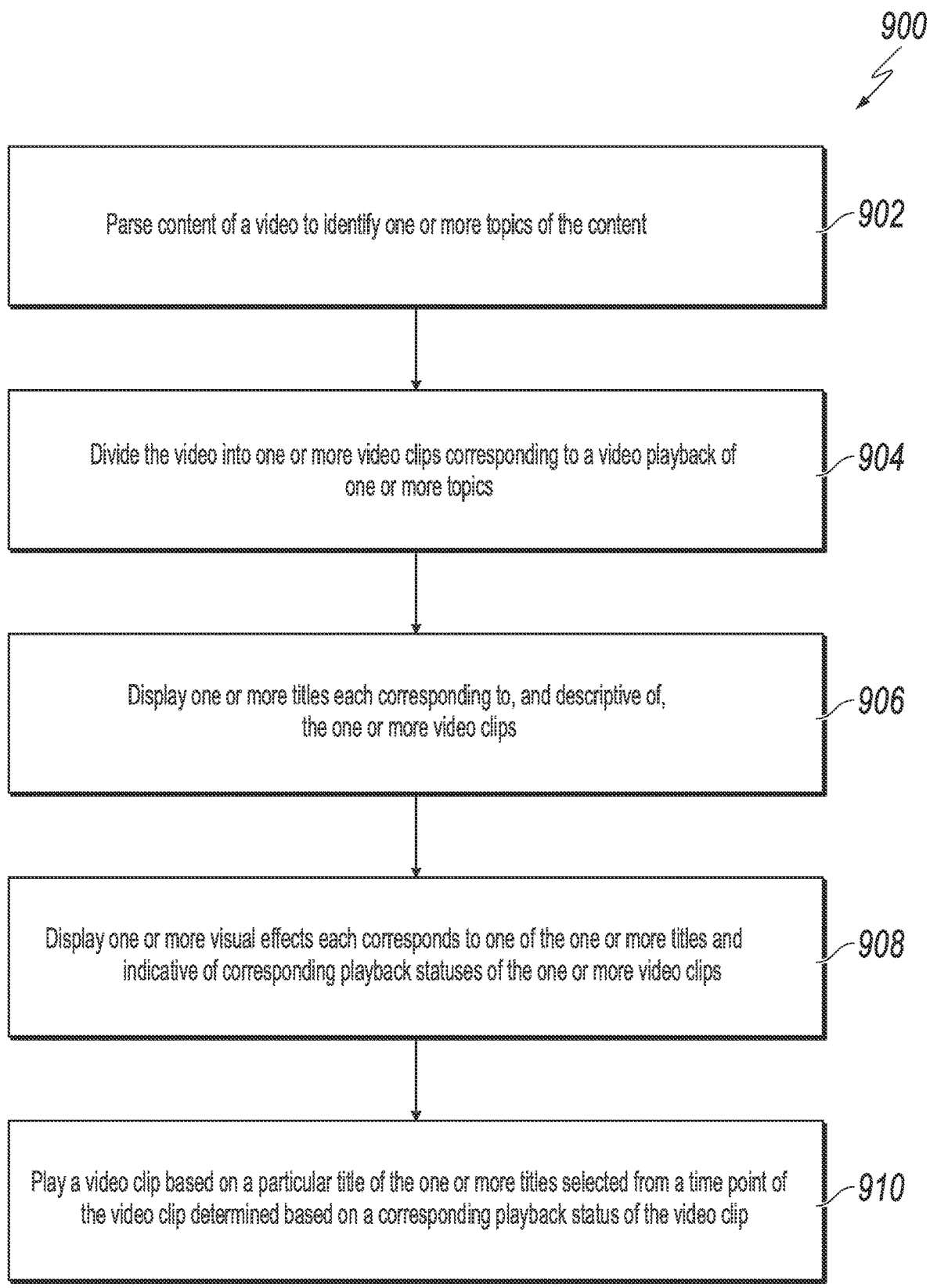
FIG. 9 is a flowchart illustrating an example of a computer-implemented method for controlling video playback, according to an implementation of the present disclosure.

FIG. 9 is a flowchart illustrating an example of a computer-implemented method 900 for controlling video playback, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, content of a video is parsed to identify one or more topics of the content. In some implementations, the one or more topics are associated with at least one of features, parts, operational steps, or functional steps of a product. In some implementations, the one or more topics are associated with at least one of features, operational steps, or functional steps of a process. In some implementations, the video is selected (for example, by a user or computer process) from a plurality of videos, and the one or more titles are displayed on a graphical user interface (GUI) using an arrangement based on the one or more topics of the content. For example, the plurality of videos can be a plurality of video tutorials of a multi-layer system. Each of the videos can correspond to a tutorial of one layer of the system. In some cases, each layer of the system can include a plurality of subsystems. In such cases, each of the videos can correspond to one of the subsystems. In some implementations, the plurality of videos can have selectable titles. In some examples, the titles can be included in one or more pull-down menus. From 902, method 900 proceeds to 904.

At 904, the video is divided into one or more video clips corresponding to a video playback of one or more topics. From 904, method 900 proceeds to 906.

At 906, one or more titles corresponding to and descriptive of the one or more video clips are displayed. From 906, method 900 proceeds to 908.

At 908, one or more visual effects corresponding to the one or more titles and indicative of corresponding playback statuses of the one or more video clips are displayed. In some examples, the titles can be shown in geographic shapes on the GUI. In some examples, the playback statuses can include statuses such as not yet played, time lapse of a previous playback of the video clip, and fully viewed. Visual effects corresponding to the playback statuses can be shown on the geographic shapes of the titles. For example, a time bar can be used to indicate the time lapse of the previous playback, a check mark can be used to indicate the video clip has been fully viewed. From 908, method 900 proceeds to 910.

At 910, a video clip is played based on a particular title of the one or more titles selected from a time point determined based on a corresponding playback status of the video clip. In some implementations, a depiction of the product that includes one or more labels corresponding to the one or more topics is displayed. In some implementations, the particular title of one or more titles is selected based on selecting a corresponding label. In some implementations, another video clip with playback time in the video later than the video clip is played, where another video is played from a time point determined based on a corresponding playback status of the other video clip. In some examples, if another video clip has not been fully viewed, another video clip can be a video clip that immediately follows the previously played video clip in time. Another video clip can be played from either the beginning or at a time when it was played in a previous playback. If the video clip immediately following the previously played video clip has been fully viewed, the other video clip can be a video clip after the previously played video clip that has not been fully viewed. After 910, method 900 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   parsing content of a video to identify two or more topics of the content;
   dividing the video into two or more video clips corresponding to a video playback of the two or more topics;
   displaying two or more titles corresponding to, and descriptive of, the two or more video clips;
   displaying two or more visual effects corresponding to the two or more titles and indicative of corresponding playback statuses of the two or more video clips;
   displaying a depiction of a product, wherein the product comprises two or more parts, wherein the depiction of the product shows the two or more parts and two or more labels, wherein each label of the two or more labels refers to at least one part of the two or more parts, wherein each label of the two or more labels is associated with a corresponding title of the two or more titles; and
   playing a video clip based on a particular title of the two or more titles selected from a time point determined based on a corresponding playback status of the video clip, wherein the particular title is selected based on selecting a particular label of the two or more labels in the depiction.

2. The computer-implemented method of claim 1, wherein the two or more topics are associated with at least one of features, parts, operational steps, or functional steps of a product.

3. The computer-implemented method of claim 2, wherein the particular title of the two or more titles is selected based on selecting a corresponding label.

4. The computer-implemented method of claim 1, wherein the two or more topics are associated with at least one of features, operational steps, or functional steps of a process.

5. The computer-implemented method of claim 1, wherein the video is selected from a plurality of videos, and wherein the two or more titles are displayed on a graphical user interface using an arrangement based on the one or more topics of the content.

6. The computer-implemented method of claim 1, further comprising playing another video clip with playback time in the video later than the video clip, wherein the another video clip is played from a time point determined based on a corresponding playback status of the another video clip.

7. A non-transitory, computer-readable medium storing one or more instructions executable by a computer system to perform operations comprising:
   parsing content of a video to identify two or more topics of the content;
   dividing the video into two or more video clips corresponding to a video playback of the two or more topics;
   displaying two or more titles corresponding to, and descriptive of, the two or more video clips;
   displaying two or more visual effects corresponding to the two or more titles and indicative of corresponding playback statuses of the two or more video clips;
   displaying a depiction of a product, wherein the product comprises two or more parts, wherein the depiction of the product shows the two or more parts and two or more labels, wherein each label of the two or more labels refers to at least one part of the two or more parts, wherein each label of the two or more labels is associated with a corresponding title of the two or more titles; and
   playing a video clip based on a particular title of the two or more titles selected from a time point determined based on a corresponding playback status of the video clip, wherein the particular title is selected based on selecting a particular label of the two or more labels in the depiction.

8. The non-transitory, computer-readable medium of claim 7, wherein the two or more topics are associated with at least one of features, parts, operational steps, or functional steps of a product.

9. The non-transitory, computer-readable medium of claim 8, wherein the particular title of the two or more titles is selected based on selecting a corresponding label.

10. The non-transitory, computer-readable medium of claim 7, wherein the two or more topics are associated with at least one of features, operational steps, or functional steps of a process.

11. The non-transitory, computer-readable medium of claim 7, wherein the video is selected from a plurality of videos, and wherein the two or more titles are displayed on a graphical user interface using an arrangement based on the two or more topics of the content.

12. The non-transitory, computer-readable medium of claim 7, further comprising playing another video clip with playback time in the video later than the video clip, wherein the another video clip is played from a time point determined based on a corresponding playback status of the another video clip.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
parsing content of a video to identify two or more topics of the content;
dividing the video into two or more video clips corresponding to a video playback of the two or more topics;
displaying two or more titles corresponding to, and descriptive of, the two or more video clips;
displaying two or more visual effects corresponding to the two or more titles and indicative of corresponding playback statuses of the two or more video clips;
displaying a depiction of a product, wherein the product comprises two or more parts, wherein the depiction of the product shows the two or more parts and two or more labels, wherein each label of the two or more labels refers to at least one part of the two or more parts, wherein each label of the two or more labels is associated with a corresponding title of the two or more titles; and
playing a video clip based on a particular title of the two or more titles selected from a time point determined based on a corresponding playback status of the video clip, wherein the particular title is selected based on selecting a particular label of the two or more labels in the depiction.

14. The computer-implemented system of claim 13, wherein the two or more topics are associated with at least one of features, parts, operational steps, or functional steps of a product, and wherein the particular title of the one or more titles is selected based on selecting a corresponding label.

15. The computer-implemented system of claim 13, wherein the two or more topics are associated with at least one of features, operational steps, or functional steps of a process.

16. The computer-implemented system of claim 13, wherein the video is selected from a plurality of videos, and wherein the two or more titles are displayed on a graphical user interface using an arrangement based on the two or more topics of the content.

17. The computer-implemented system of claim 13, further comprising playing another video clip with playback time in the video later than the video clip, wherein the another video clip is played from a time point determined based on a corresponding playback status of the another video clip.

\* \* \* \* \*